United States Patent
Bates et al.

(10) Patent No.: US 9,662,622 B2
(45) Date of Patent: May 30, 2017

(54) OXYGEN SCAVENGING SYSTEM FOR A CONTAINER

(71) Applicant: Amcor Limited, Hawthorn (AU)

(72) Inventors: Peter Bates, Chelsea, MI (US); Terry D. Patcheak, Ypsilanti, MI (US); Frederick C. Beuerle, Jackson, MI (US); Reinhard C. J. Luchies, Ann Arbor, MI (US); John G. Brace, Saline, MI (US); Michael T. Lane, Brooklyn, MI (US); Holly Bilinski, Ypsilanti, MI (US); Luke A. Mast, Brooklyn, MI (US)

(73) Assignee: Amcor Limited, Hawthorn (AU)

( * ) Notice: Subject to any disclaimer, the term of this patent is extended or adjusted under 35 U.S.C. 154(b) by 36 days.

(21) Appl. No.: 14/739,657

(22) Filed: Jun. 15, 2015

(65) Prior Publication Data
US 2015/0273431 A1    Oct. 1, 2015

Related U.S. Application Data (63) Continuation of application No. 13/167,967, filed on Jun. 24, 2011, now Pat. No. 9,108,176.
(Continued)

(51) Int. Cl.
*B01J 7/02* (2006.01)
*C01B 3/06* (2006.01)
(Continued)

(52) U.S. Cl.
CPC ............ *B01J 7/02* (2013.01); *B01J 19/245* (2013.01); *B65D 25/02* (2013.01); *B65D 43/02* (2013.01); *B65D 81/266* (2013.01); *C01B 3/065* (2013.01); *C01B 5/00* (2013.01); *B01J 2219/24* (2013.01); *Y02E 60/362* (2013.01)

(58) Field of Classification Search
CPC ......................................................... B01J 7/02
See application file for complete search history.

(56) References Cited

U.S. PATENT DOCUMENTS 3,419,400 A   12/1968 Hayhurst et al.
3,811,999 A    5/1974 Fleischer et al.
(Continued)

FOREIGN PATENT DOCUMENTS

EP    0758611 A1    2/1997
EP    2404753 A1    1/2012
(Continued)

OTHER PUBLICATIONS

International Search Report and Written Opinion dated Feb. 28, 2012 from corresponding International Patent Application No. PCT/US2011/041770.
(Continued)

*Primary Examiner* — Lessanework Seifu
(74) *Attorney, Agent, or Firm* — Harness, Dickey & Pierce, PLC (57) ABSTRACT

A container having a hydrogen generator and catalyst disposed or otherwise incorporated in components of the container. The container further comprises a system for providing at least a portion of the hydrogen generator and/or catalyst in an area defined within the closure of the container for improved performance.

18 Claims, 8 Drawing Sheets

Related U.S. Application Data (60) Provisional application No. 61/358,456, filed on Jun. 25, 2010.

(51) Int. Cl.
    *C01B 5/00*     (2006.01)
    *B65D 81/26*     (2006.01)
    *B01J 19/24*     (2006.01)
    *B65D 25/02*     (2006.01)
    *B65D 43/02*     (2006.01)

(56) References Cited

U.S. PATENT DOCUMENTS

| | | | |
|---|---|---|---|
| 4,013,422 | A | 3/1977 | Spinner et al. |
| 4,279,350 | A | 7/1981 | King |
| 4,421,235 | A | 12/1983 | Moriya |
| 4,516,679 | A | 5/1985 | Simpson et al. |
| 4,526,752 | A | 7/1985 | Perlman et al. |
| 5,045,283 | A | 9/1991 | Patel |
| 5,114,507 | A | 5/1992 | Piltz et al. |
| 5,316,949 | A | 5/1994 | Bull et al. |
| 5,358,876 | A | 10/1994 | Inoue et al. |
| 5,735,984 | A | 4/1998 | Hoff et al. |
| 5,804,236 | A | 9/1998 | Frisk |
| 5,934,494 | A | 8/1999 | Takahashi et al. |
| 6,139,935 | A | 10/2000 | Cullen et al. |
| 6,254,969 | B1 | 7/2001 | Eberle |
| 6,454,965 | B1 | 9/2002 | Ching et al. |
| 6,689,438 | B2 | 2/2004 | Kennedy et al. |
| 6,986,807 | B2 | 1/2006 | Brunk |
| 7,021,478 | B1 | 4/2006 | Hock |
| 7,159,374 | B2 | 1/2007 | Abercrombie, III et al. |
| 7,368,153 | B2 | 5/2008 | Barmore et al. |
| 7,862,770 | B2 | 1/2011 | Shahriari |
| 2004/0050740 | A1 | 3/2004 | Lewis |
| 2004/0071885 | A1 | 4/2004 | Hutchinson et al. |
| 2005/0087452 | A1 | 4/2005 | McAnalley et al. |
| 2009/0074611 | A1 | 3/2009 | Monzyk et al. |
| 2009/0220717 | A1 | 9/2009 | Wilczak et al. |
| 2010/0028499 | A1 | 2/2010 | Rule et al. |
| 2012/0114529 | A1 | 5/2012 | Carmichael et al. |
| 2012/0118764 | A1 | 5/2012 | Valus et al. |

FOREIGN PATENT DOCUMENTS

| | | | |
|---|---|---|---|
| WO | WO-96/34070 | A1 | 10/1996 |
| WO | WO-99/28411 | A1 | 6/1999 |
| WO | WO-00/35304 | A1 | 6/2000 |
| WO | WO-00/54866 | | 9/2000 |
| WO | WO-02/099416 | A1 | 12/2002 |
| WO | WO-2006/112958 | A2 | 10/2006 |
| WO | WO2008/090354 | * | 7/2008 |
| WO | WO-2008090354 | A1 | 7/2008 |
| WO | WO-2010/115992 | A1 | 10/2010 |
| WO | WO-2010/116192 | A1 | 10/2010 |
| WO | WO-2011/157695 | A1 | 12/2011 |

OTHER PUBLICATIONS

Supplementary European Search Report dated Aug. 1, 2013 from corresponding International Patent Application No. PCT/US2011027715.

Supplementary European Search Report dated Dec. 18, 2013 in corresponding European patent application No. 11798972.3.

Supplementary European Search Report mailed Oct. 24, 2014 in corresponding European patent application Serial No. 11753991.6.

* cited by examiner

OXYGEN SCAVENGING SYSTEM FOR A CONTAINER

CROSS-REFERENCE TO RELATED APPLICATIONS

This application is a continuation of U.S. patent application Ser. No. 13/167,967 filed Jun. 24, 2011, which claims the benefit of U.S. Provisional Application No. 61/358,456 filed on Jun. 25, 2010. The entire disclosures of these applications are incorporated herein by reference.

FIELD

This disclosure generally relates to containers for retaining a commodity, such as a solid or liquid commodity. More specifically, this disclosure relates to a container having being suitable for receiving an oxygen scavenging system, such as a hydrogen generator and/or catalyst.

BACKGROUND

This section provides background information related to the present disclosure which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho a$ is the density of pure amorphous PET material (1.333 g/cc); and $\rho c$ is the density of pure crystalline material (1.455 g/cc).

Unfortunately, PET is a poor barrier to oxygen. One of the main factors that limit the shelf life of foods and beverages (herein known as "fills") in PET containers is the ingress of oxygen through the walls of the container followed by oxidation of the fill. Many strategies have been employed to reduce the amount of oxygen in contact with food in PET containers. Some strategies include headspace replacement, which replaces oxygen in the headspace during packaging with an inert gas, such as N2 or C02. Alternative strategies include using package barrier coatings, such as chemical vapor deposited (CVD) aluminum or silicon. Still further, some strategies include the use of embedded barrier layers, such as multilayer packages, or PET barrier additives that create physical barriers to oxygen diffusion through the packaging (e.g., nylon, nanoclays). Finally, some strategies have used oxygen scavengers that react with oxygen in a predetermined way (e.g., oxidizable plastics, hydrogen gas, reactive metals & organic molecules) to minimize its effect, which usually requires the use of a catalyst.

An example of oxygen reducing technology is available from ColorMatrix (International Publication Number WO 2008/090354 A1, which is hereby incorporated by reference). The technology involves the slow release of hydrogen from the container using a hydrogen generator. The hydrogen subsequently reacts with oxygen in the presence of a metal catalyst to create water. Hydrogen that does not react with oxygen will slowly permeate out of the container.

However, the ColorMatrix system is predicated on the chemical reaction between the hydrogen generator, such as sodium borohydride, and a catalyst. Due to the need for water, in some embodiments, for the generation of the molecular hydrogen, placement of the sodium borohydride and water in the container can be critical. However, in some application, placement of the sodium borohydride, such as in the closure or closure shell of the container, may limit the amount of water (i.e. moisture) reacting with the compound (i.e. sodium borohydride) because other components used in the container, namely HDPE and PP, may be hydrophobic and, thus, limit the permeability of water.

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

SUMMARY

This section provides a general summary of the disclosure, and is not a comprehensive disclosure of its full scope or all of its features.

According to the principles of the present teachings, a container is provided having systems for receiving an oxygen scavenging system, such as a hydrogen generator and catalyst, disposed or otherwise incorporated in components of the container. The container further comprises a system for providing at least a portion of the hydrogen generator and/or catalyst in an area defined within the closure of the container for improved performance.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

This disclosure provides for a container being made of PET and incorporating a hydrogen generator and catalyst component. The container of the present teachings controls and/or reduces the effect of oxygen penetrating the container material and entering the commodity or fill contained therein. The present teachings are directed to facilitating the generation of the molecular hydrogen in the hydrogen generator.

It should be appreciated that the size and specific configuration of the container may not be particularly limiting and, thus, the principles of the present teachings can be applicable to a wide variety of thermoplastic container shapes and system configurations. Therefore, it should be recognized that variations can exist in the present embodiments. That is, it should be appreciated that the teachings of the present disclosure can be used in a wide variety of thermoplastic containers, including reusable/disposable packages including resealable plastic bags, resealable containers, dried food containers (e.g., dried milk), drug containers, and oxygen-sensitive chemical packaging.

Figure 1:
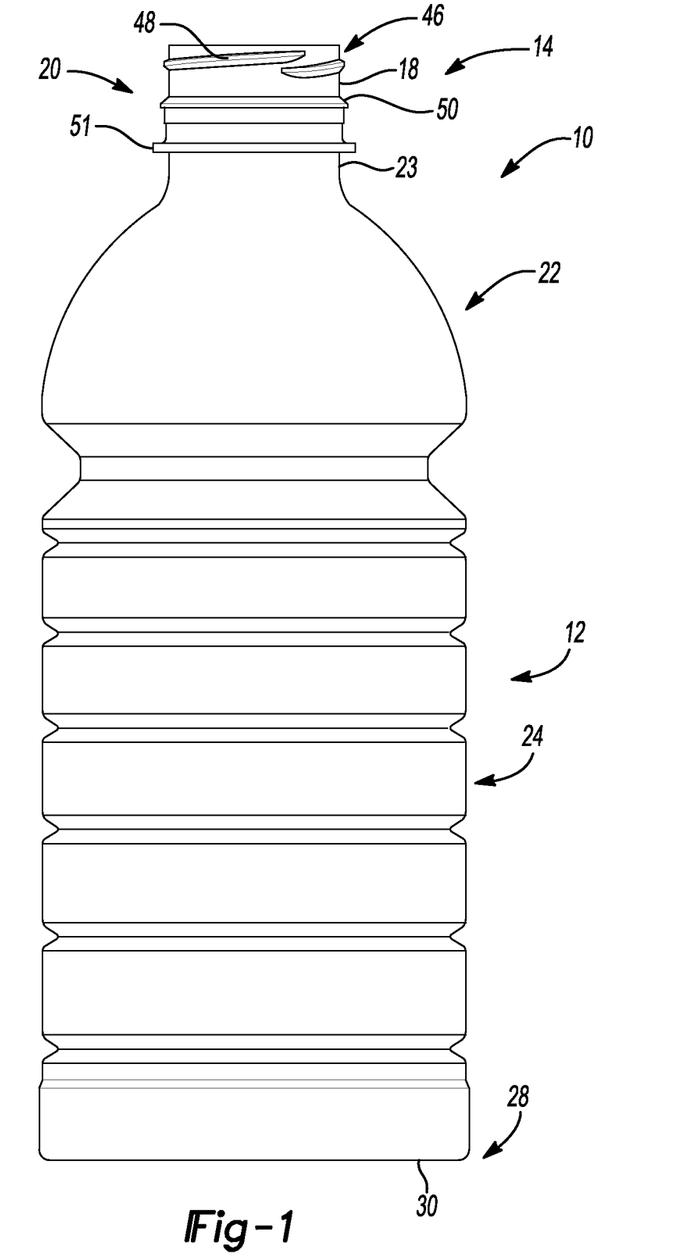
FIG. 1 is a side view of an exemplary container incorporating the features of the present teachings.

Accordingly, the present teachings provide a plastic, e.g. polyethylene terephthalate (PET), container generally indicated at 10. The exemplary container 10 can be substantially elongated when viewed from a side. Those of ordinary skill in the art would appreciate that the following teachings of the present disclosure are applicable to other containers, such as rectangular, triangular, pentagonal, hexagonal, octagonal, polygonal, or square shaped containers, which may have different dimensions and volume capacities. It is also contemplated that other modifications can be made depending on the specific application and environmental requirements.

In some embodiments, container 10 has been designed to retain a commodity. The commodity may be in any form such as a solid or semi-solid product. In one example, a commodity may be introduced into the container during a thermal process, typically a hot-fill process. For hot-fill bottling applications, bottlers generally fill the container 10 with a product at an elevated temperature between approximately 155° F. to 205° F. (approximately 68° C. to 96° C.) and seal the container 10 with a closure before cooling. In addition, the plastic container 10 may be suitable for other high-temperature pasteurization or retort filling processes or other thermal processes as well. In another example, the commodity may be introduced into the container under ambient or cold temperatures.

As shown in FIG. 1, the exemplary plastic container 10 according to the present teachings defines a body 12, and includes an upper portion 14 having a cylindrical sidewall 18 forming a finish 20. Integrally formed with the finish 20 and extending downward therefrom is a shoulder portion 22. The shoulder portion 22 merges into and provides a transition between the finish 20 and a sidewall portion 24. The sidewall portion 24 extends downward from the shoulder portion 22 to a base portion 28 having a base 30. In some embodiments, sidewall portion 24 can extend down and nearly abut base 30, thereby minimizing the overall area of base portion 28 such that there is not a discernable base portion 28 when exemplary container 10 is uprightly-placed on a surface.

The exemplary container 10 may also have a neck 23. The neck 23 may have an extremely short height, that is, becoming a short extension from the finish 20, or an elongated height, extending between the finish 20 and the shoulder portion 22. The upper portion 14 can define an opening for filling and dispensing of a commodity stored therein. Although the container is shown as a drinking container, it should be appreciated that containers having different shapes, such as sidewalls and openings, can be made according to the principles of the present teachings.

The finish 20 of the exemplary plastic container 10 may include a threaded region 46 having threads 48, a lower sealing ridge 50, and a support ring 51. The threaded region provides a means for attachment of a similarly threaded closure or cap 100 (FIGS. 2-6, 8, and 9). Alternatives may include other suitable devices that engage the finish 20 of the exemplary plastic container 10, such as a press-fit or snap-fit cap or a combi-closure system, or induction welded to foil for example. Accordingly, the closure or cap 100 engages the finish 20 to preferably provide a hermetical seal of the exemplary plastic container 10. The closure or cap 100 is preferably of a plastic or metal material conventional to the closure industry and suitable for subsequent thermal processing.

The container 10, of the present teachings, is directed to facilitating the generation of the molecular hydrogen in the hydrogen generator. As is known, as described herein, some chemical reactions used for the generation of molecular hydrogen are predicated on the availability of water. Due to this need for water, in some embodiments, placement of the sodium borohydride and water in the container can be critical. Therefore, the present teachings provide apparatus and methods for providing sufficient water for use in the generation of molecular hydrogen by the hydrogen generator.

In some embodiments, the hydrogen generator, perhaps in the form of sodium borohydride, may be placed in a liner material disposed in the underside of the closure. This may be a viable option with a liner material made from a polar material, such as EVA-based materials. However, it may be desirable when the liner material is made from non-polar liner materials, such as the styrenic rubber materials (SEBS/SIBS/SEPS).

The closure technology of today is progressing such that closures can be provided in hot-fill or cold-fill applications without the need for internal liners. In hot-fill applications, many of these new systems employ an inner bore seal to engage and seal the container along the inside diameter of the opening. Since these systems form an adequate seal without using a liner, the liner and/or liner area, typically defined by an area inside the closure, can be used for introducing system components for the hydrogen generator and/or catalyst.

Figure 2:
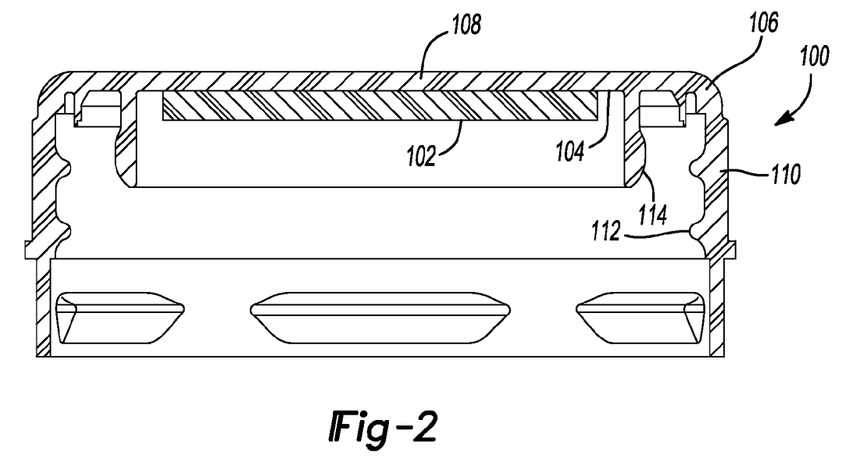
FIG. 2 is a cross-sectional view of a closure according to some embodiments of the present teachings.

With reference to FIG. 2, closure 100 is illustrated having an additive insert member 102 disposed in an underside 104 of closure 100. Generally, additive insert member 102 can comprise any one of a number of desired component(s) of the hydrogen generator and/or catalyst.

Closure 100 can comprise, in some embodiments, a body portion 106 having a top portion 108 and a circumferential, downwardly-extending side portion 110. Threads 112 can be disposed on an inner side of downwardly-extending side portion 110 of closure 100 for threadingly engaging corresponding threads 48 of finish 20 for sealing engagement therewith. Closure 100 can further comprise a circumferential, inwardly-offset seal 114 downwardly-extending from underside 104 for engaging an inner diameter of finish 20 to provide improved sealing engagement therewith.

In some embodiments, as illustrated in FIG. 2, additive insert member 102 can be sized to fit within an area bound by the circumferential, inwardly-offset seal 114 and underside 104. Additive insert member 102 can be molded in place, in some embodiments. Additive insert member 102 can, thus, releases hydrogen without affecting the seal area of the closure.

Figure 3:
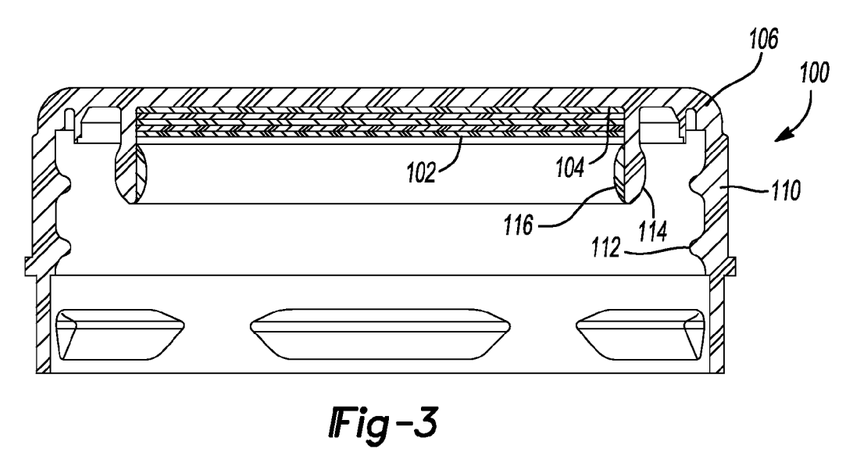
FIG. 3 is a cross-sectional view of a closure according to some embodiments of the present teachings.

With reference to FIG. 3, in some embodiments additive insert member 102 can be a punched-in liner or patch pad (discussed herein) containing desired component(s) of the hydrogen generator and/or catalyst. A retention feature 116 can be added along an inner side of the circumferential, inwardly-offset seal 114 for retention of additive insert member 102. It should be understood that in some embodiments, additive insert member 102 can be mounted using any one of a number of known methods, including adhesives (such as EVA or maleic anhydride), press-fit, snap-fit, and the like.

Figure 4A:
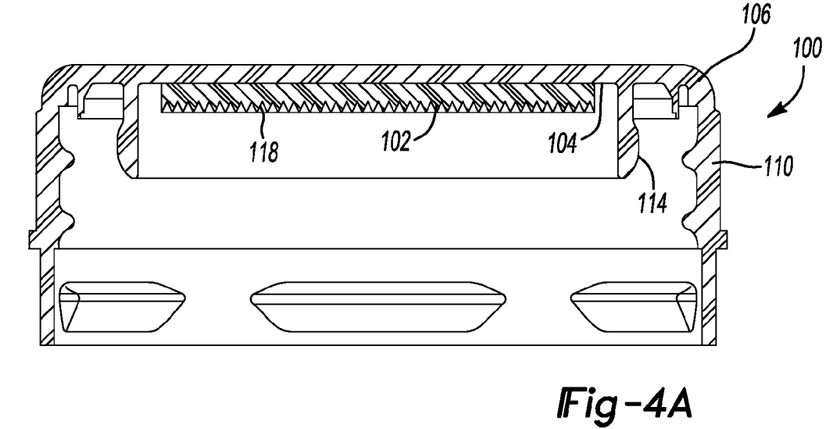
FIG. 4A is a cross-sectional view of a closure according to some embodiments of the present teachings having an insert member defining a varied topography.
Figure 4B:
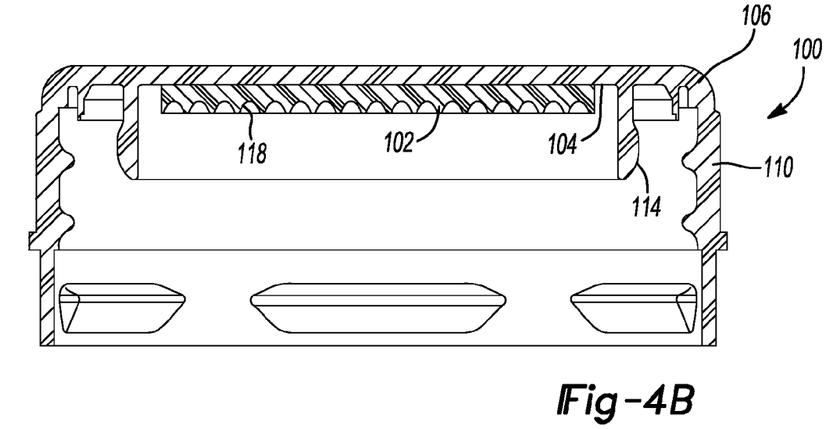
FIG. 4B is a cross-sectional view of a closure according to some embodiments of the present teachings having an insert member defining a varied topography.
Figure 5:
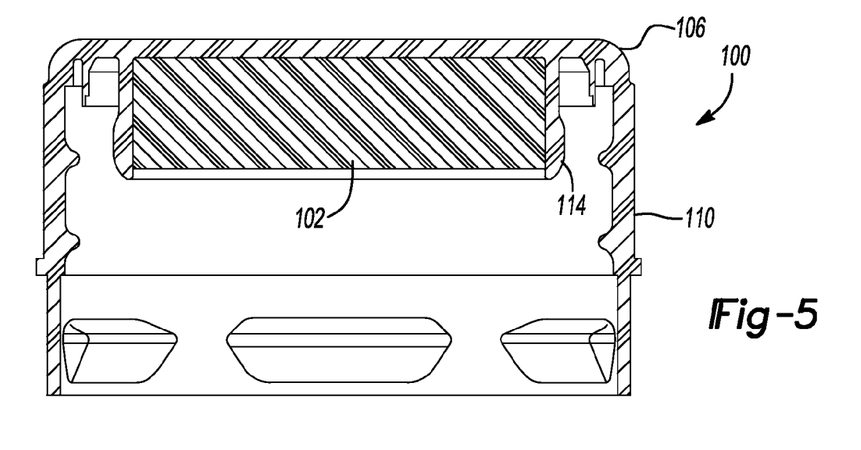
FIG. 5 is a cross-sectional view of a closure according to some embodiments of the present teachings having an insert member defining an elongated dimension.
Figure 6A:
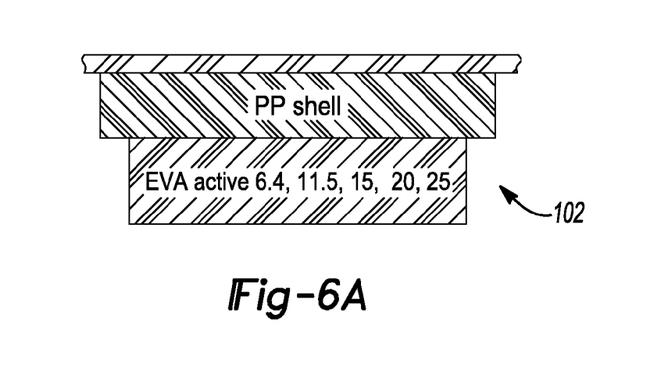
FIGS. 6A-6H are schematic cross-sectional views illustrating various combinations of materials which may be used with the insert member of the present teachings.
Figure 6B:
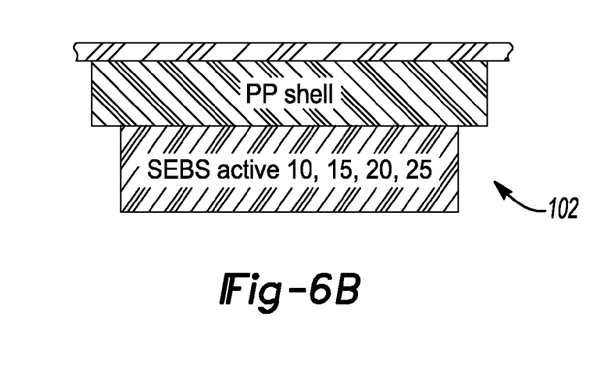
Figure 6C:
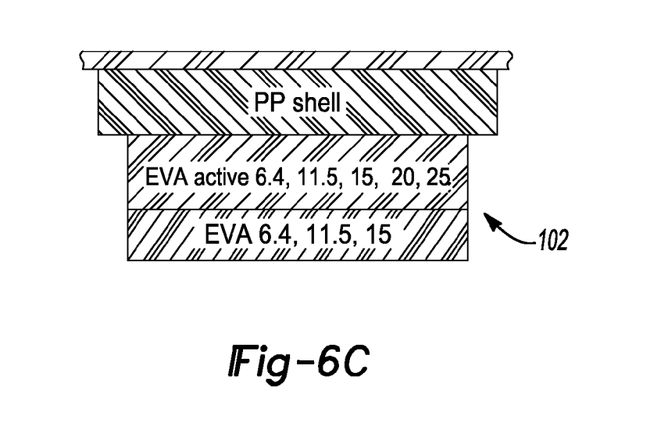
Figure 6D:
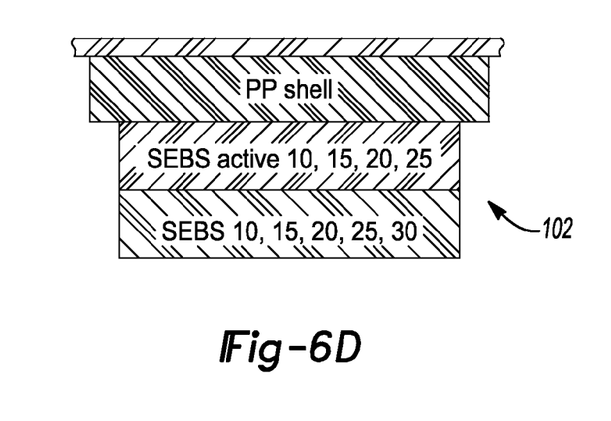
Figure 6E:
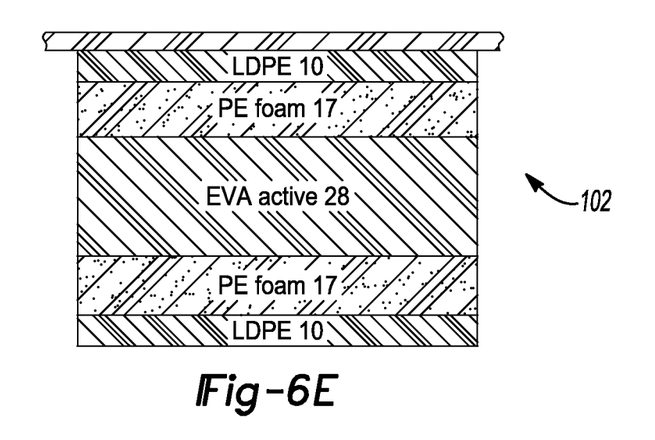
Figure 6F:
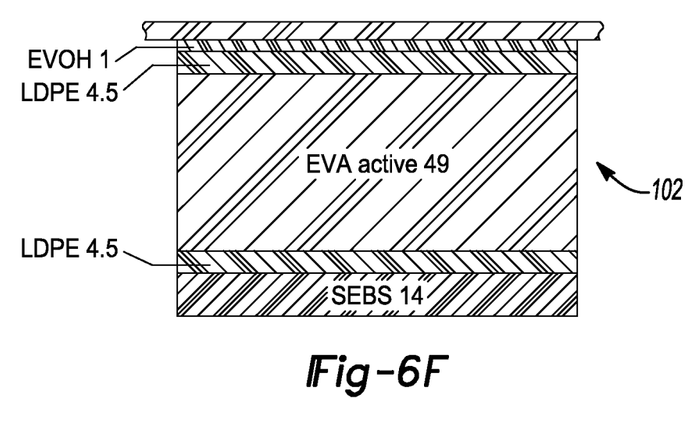
Figure 6G:
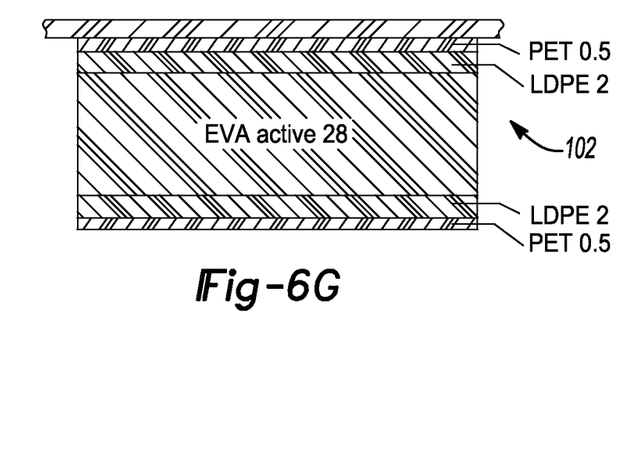
Figure 6H:
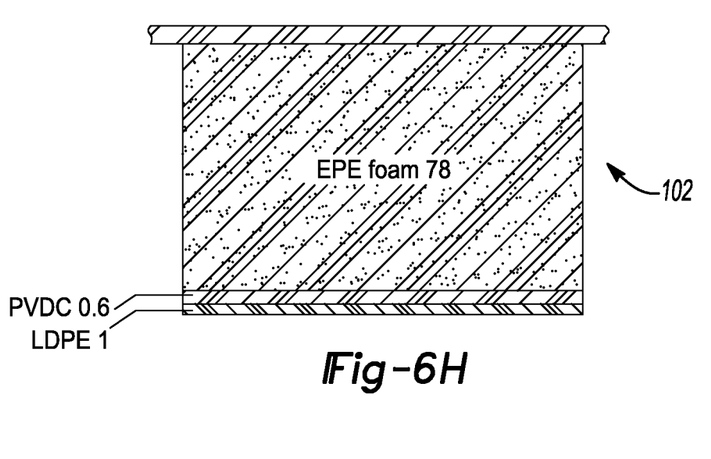

Referring now to FIGS. 4A and 4B, in some embodiments, surface geometries 118 of additive insert member 102 can be used to affect the rate of hydrogen evolution from the closure liner. That is, in some embodiments, the increased surface area allows for more moisture to come into contact with the borohydride and thus releases more hydrogen at a given time. By adjusting the liner surface area through shape, depth, and the like, the hydrogen evolution rate can be tailored for a given package. Additionally, as seen in FIG. 5, the size and/or length of circumferential, inwardly-offset seal 114 can be modified to accommodate a larger additive insert member 102 to enable effective use of the technology in smaller diameter closures and/or increased capacity.

With reference to FIGS. 6A-6H, alternative closure and/or additive insert member 102 configurations are provided to permit varied performance characteristics. It should be appreciated from the foregoing that various layering techniques can be used to provide varied performance, delayed activation, and the like.

Figure 7:
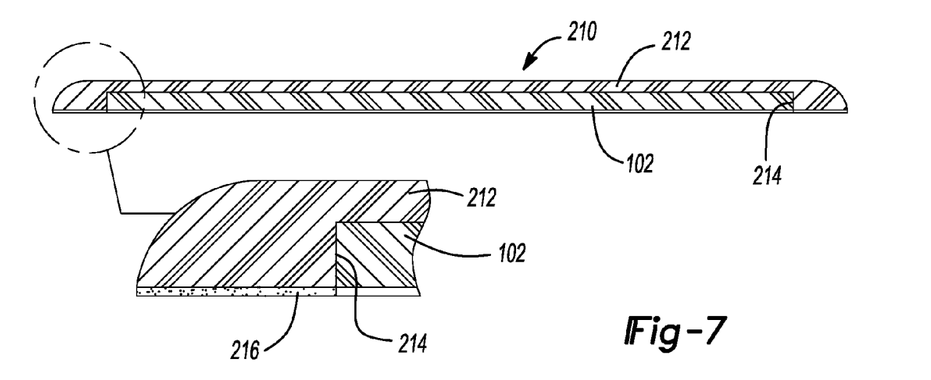
FIG. 7 is a cross-sectional view of a patch pad according to some embodiments of the present teachings connectable to a surface.
Figure 8:
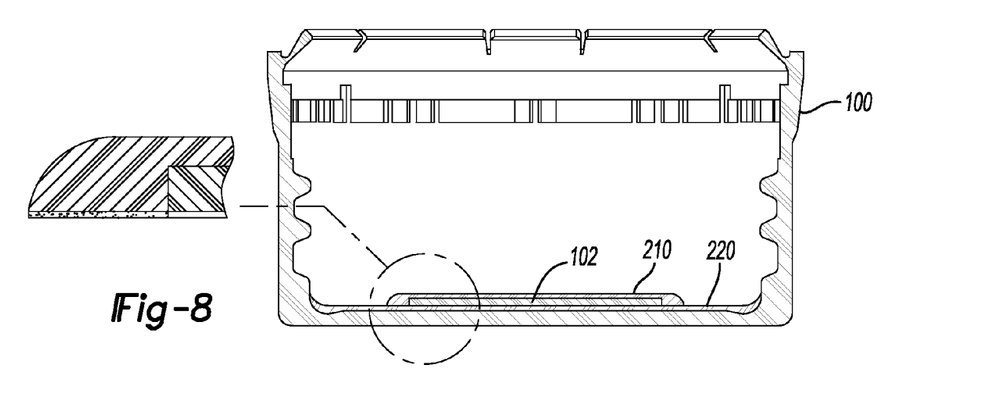
FIG. 8 is a cross-sectional view of a patch pad according to some embodiments of the present teachings disposed in a closure member.
Figure 9:
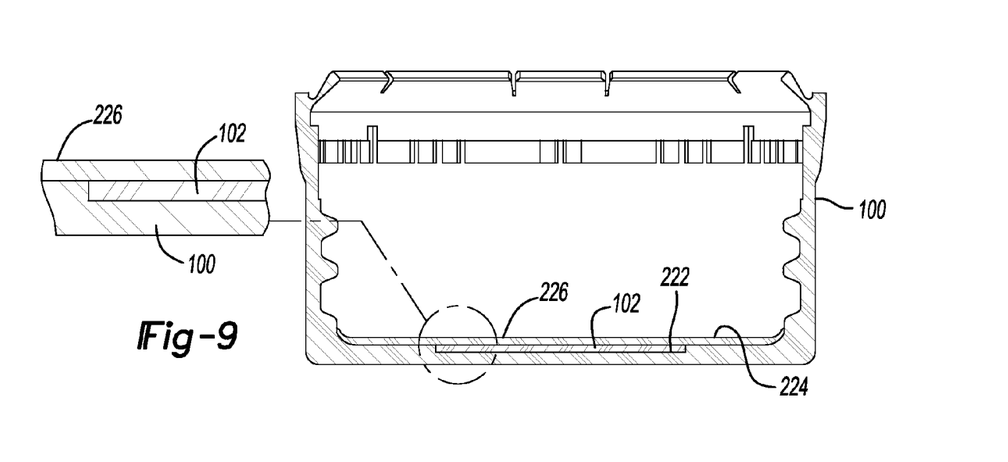
FIG. 9 is a cross-sectional view of a patch pad according to some embodiments of the present teachings recessed in a closure member.

With particular reference to FIGS. 7-9, it should be understood that additive insert member 102 can be in the form of a patch member 210. Patch member 210 can be appropriately sized and shaped to be applied or otherwise contained within the container 10 and/or closure 100. More particularly, as illustrated in FIG. 7, patch member 210 can be an encapsulated pad or patch that is connectable, such as via molding, adhesive or other connection system, to the container 10 and/or closure 100. Patch member 210 may comprise a barrier member 212 having an interior volume 214 for receiving the additive insert member 102 therein. In some embodiments, patch member 210 can comprise an adhesive 216 disposed on a side 218 generally adjacent interior volume 214 to permit application of the patch member 210 to container 10 and/or closure 100. Otherwise, patch member 210, having additive insert member 102, can be disposed and connection to the container 10 and/or closure 100 using other conventional methods or novel methods defined herein.

As illustrated in FIG. 8, patch member 210 can be applied to an interior surface of closure 100 such that patch member 210 is connected via adhesive 216 to a standard closure liner 220. It should be appreciated, however, that standard closure liner 220 is optional and, thus, can be removed such that patch member 210 is connected to closure 100 directly.

In some embodiments, as illustrated in FIG. 9, patch member 210 can simply comprise additive insert member 102 disposed within a recess or volume 222 formed in closure 100. Specifically, closure 100 can be molded such that a depression 222 is formed in an interior surface thereof, such as the uppermost surface 224. Depression 222 can be sized to receive additive insert member 102 therein such that a layer 226, such as a liner, can be molded over additive insert member 102 to contain or otherwise encapsulated within closure 100.

Figure 10:
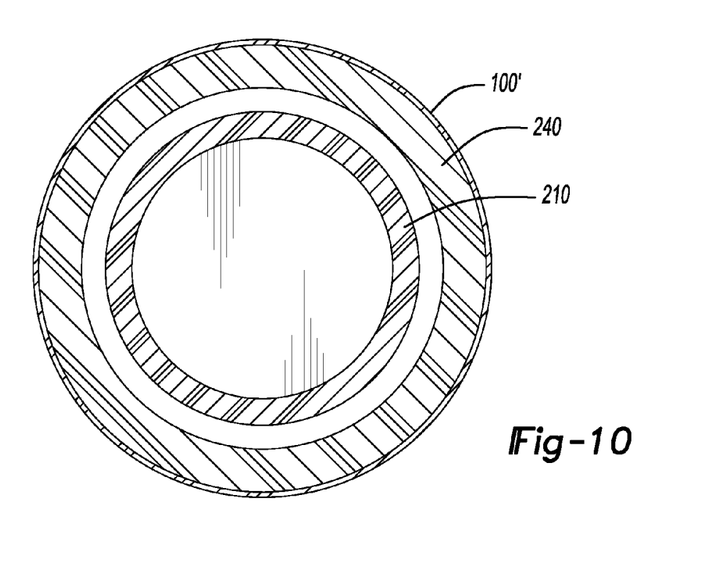
FIG. 10 is a top view of a patch pad according to some embodiments of the present teachings disposed on a combi-closure system.

In some embodiments, as illustrated in FIG. 10, patch member 210 can be applied to a combi-closure system type closure 100'. As is known, combi-system type closures typically employ a metallic central member 240 and a plastic retaining ring member (not shown). According to the present teachings, patch member 210 can be affixed to the metallic central member 240 such that it is generally centrally placed relative to central member 240 to permit and not otherwise impede the added barrier properties available from combi-closure systems.

Figure 11:
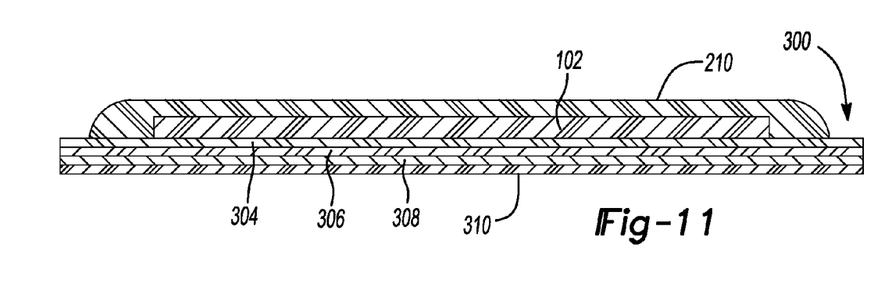
FIG. 11 is a cross-sectional view of a patch pad according to some embodiments of the present teachings disposed on a foil seal.
Figure 12:
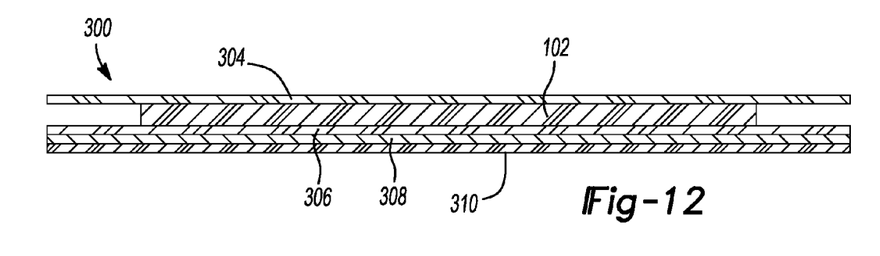
FIG. 12 is a cross-sectional view of an additive insert member according to some embodiments of the present teachings incorporated into a foil seal.
Figures 13, 14, 15, 16:
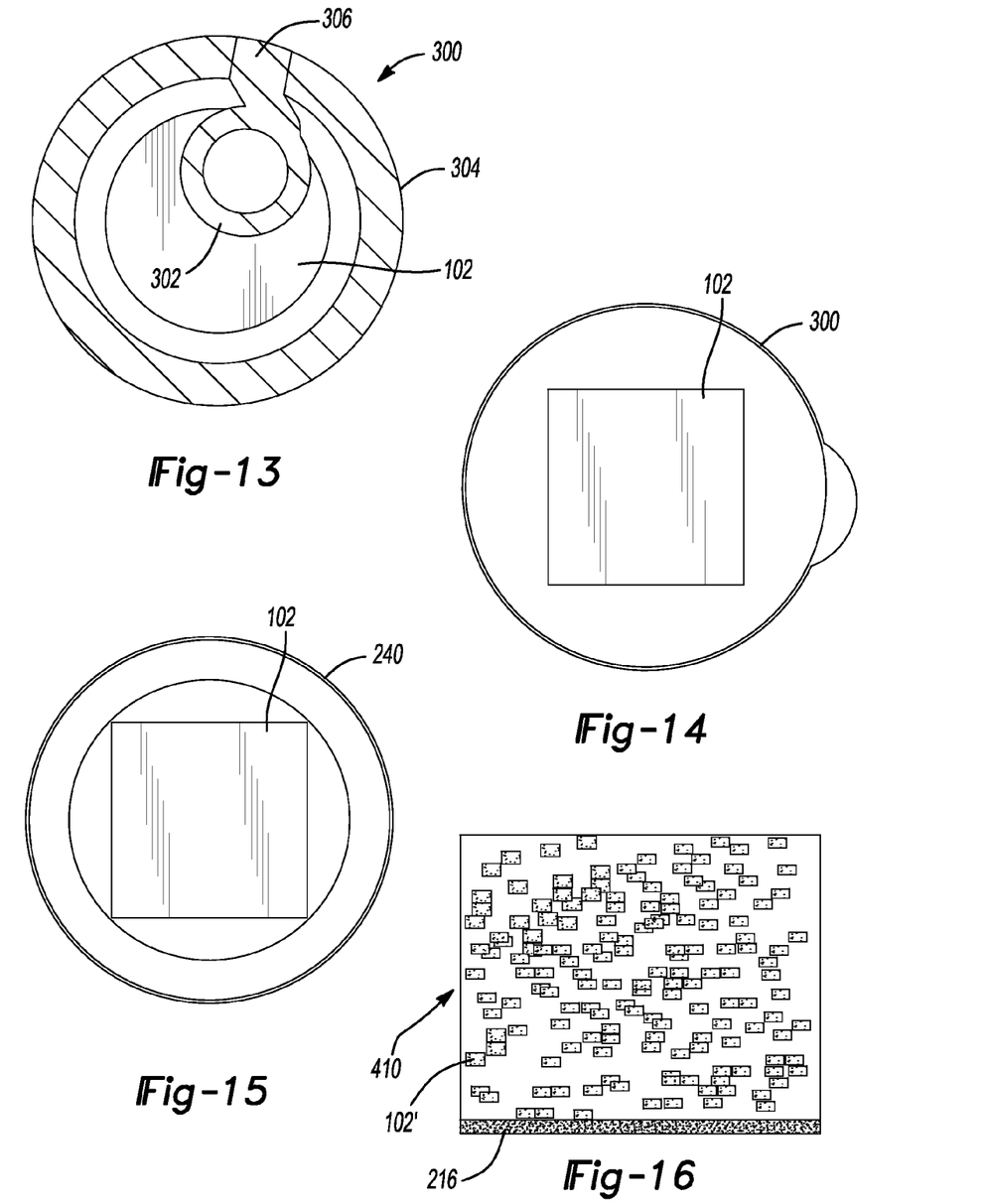
FIG. 13 is a top view of a patch pad according to some embodiments of the present teachings incorporated into a foil seal.
FIG. 14 is a top view of an additive insert member according to some embodiments of the present teachings printed on a foil seal.
FIG. 15 is a top view of an additive insert member according to some embodiments of the present teachings printed on a combi-closure system.
FIG. 16 is a cross-sectional view of an additive insert member according to some embodiments of the present teachings in the form of a sealed canister.

Several containers available today employ an induction foil seal over the finish of the container to hermetically seal the contents of the container. In some embodiments, as illustrated in FIGS. 11-13, additive insert member 102 can be applied to the foil seal 300. Specifically, in some embodiments, additive insert member 102 can be part of patch member 210 that is applied directly to foil seal 300. In this way, patch member 210 can be adhesively bonded to foil seal 300. In some embodiments, patch member 210 can be coupled such that a multi-layer assembly 302 is disposed adjacent patch member 210. Specifically, the patch member 210 can be affixed such that patch member 210 is coupled to a first layer 304, such as a weld material to PET finish; a second layer 306, such as a barrier layer; a third layer 308, such as foil; and a fourth layer 310, such as a backing. However, in some embodiments, as illustrated in FIG. 12, additive insert member 102 can be incorporated and/or encapsulated such that it forms a multi-layer assembly having first layer 304, such as a weld material to PET finish; additive insert member 102; a second layer 306, such as a barrier layer; a third layer 308, such as foil; and a fourth layer 310, such as a backing, respectively. In this way, additive insert member 102 can be incorporated directly into the manufacture of the foil sheet.

Alternatively, as illustrated in FIG. 13, in some embodiments, additive insert member 102 can be incorporated into a pull-tab type foil seal 300, which is also known as a peel-and-toss type seal. Pull-tab type foil seal 300 can comprise a peel and toss ring 302 coupled to a main body portion 304 at a ring overlap 306. Additive insert member 102 can be applied or incorporated into foil seal 300 as described herein. Pull-tab type foil seal 300 can further comprise an outer ring 308 disposed about the periphery thereof that bounds additive insert member 102 and provides, in some embodiment, increased integrity of foil seal 300 to ensure that upon removal the foil seal remains intact and does not cause accidental tearing or breach of additive insert member 102. In some embodiments, additive insert member 102 can be applied as a spray coating, patch member, printed, or the like.

With reference to FIGS. 14 and 15, in some embodiments, additive insert member 102 can be printed upon the foil seal 300 (FIG. 14) and/or combi-closure 100' (FIG. 15). Specifically, in some embodiments, additive insert member 102 is printed upon the substrate using known printing techniques, such as ink jet printing, offset printing, silkscreening, and the like. It should be noted that other printing techniques can be used wherein the components of additive insert member 102 are prepared in liquid or powder form and thus suitable for printing using common printing techniques. Through the application of additive insert member 102 to foil seal 300, the components of additive insert member 102 are permitted to permeate through the appropriate barrier into the headspace and/or commodity of the container. With regard to the combi-closure 100', it should be noted that additive insert member 102 can be printed directly upon the metallic central member 240.

Finally, in some embodiments as illustrated in FIG. 16, additive insert member 102 can be a canister or capsule 410. Canister 410 can comprise an enclosed structure, such as an enclosed cylinder, having additive insert member 102 contained therein. In some embodiments, additive insert member 102 can comprise a plurality of additive insert member pellets 102'. Canister 410 can further comprise an adhesive 412, if desired, for mounting the canister 410 within container 10 and/or closure 100. In some embodiments, canister 410 can be placed loosely within the container 10. In some embodiments, canister 410 can be mounted to an interior bottom surface of container 10 and/or an interior surface of closure 100 using known sealing techniques such as ultrasonic welding, heat sealing, induction sealing, or the like. In this way, canister 410 can be used to easily and conveniently convert an existing container design to one having the benefits of the present teachings. Food grade markings can be placed on canister 410 to indicate that additive insert member 102 should not be eaten.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A container comprising:
a body having an interior volume and a finish;
a closure member configured to engage the body, the closure member including a foil seal;
a hydrogen generator generating molecular hydrogen;
a catalyst catalyzing a chemical reaction between the hydrogen and oxygen; and
an insert member in communication with the interior volume, the insert member containing at least one of the hydrogen generator, the catalyst, and a chemical component for chemical reaction with either the hydrogen generator or the catalyst, wherein the insert member is a lamination connected to the closure member, the lamination including a barrier member, the hydrogen generator, the catalyst, and the chemical component.

2. The container of claim 1, wherein the insert member is encapsulated in the foil seal.

3. The container of claim 1, wherein the insert member is printed on the foil seal.

4. The container of claim 1, wherein the insert member is formed with the foil seal, the foil seal having a pull tab and a circumferential ring.

5. The container of claim 1, wherein the lamination is connected to the body.

6. The container of claim 5, wherein the lamination is laminated to the foil seal.

7. The container of claim 5, wherein the lamination is coupled to the foil seal.

8. The container of claim 1, wherein the foil seal is induction welded to the finish.

9. The container of claim 1, wherein the closure member is a foil and the lamination is laminated to the foil.

10. The container of claim 1, wherein the closure member is a foil seal and the lamination is laminated to the foil seal.

11. The container of claim 1, wherein the closure member is a foil and the lamination is coupled to the foil.

12. The container of claim 1, wherein the closure member is a foil seal and the insert member is laminated thereto, the foil seal having a pull tab and a circumferential ring.

13. A container comprising:
a body having an interior volume and a finish;
a closure member configured to engage the body, the closure member including a foil seal;
a hydrogen generator generating molecular hydrogen;
a catalyst catalyzing a chemical reaction between the hydrogen and oxygen; and
an insert member in communication with the interior volume, the insert member containing at least one of the hydrogen generator, the catalyst, and a chemical component for chemical reaction with either the hydrogen generator or the catalyst;
wherein the insert member is a lamination having a barrier member, the hydrogen generator, the catalyst, and the chemical component; and
wherein the lamination is connected to the closure member.

14. The container of claim 13, wherein the insert member is laminated to the foil seal.

15. The container of claim 13, wherein the insert member is coupled to the foil seal.

16. The container of claim 13, wherein the insert member is encapsulated within the foil seal.

17. The container of claim 13, wherein the foil seal has a pull tab and a circumferential ring.

18. The container of claim 13, wherein the foil seal is induction welded to the finish.

* * * * *